(12) United States Patent
Hatch et al.

(10) Patent No.: US 7,540,955 B2
(45) Date of Patent: Jun. 2, 2009

(54) PHOTOCATALYTIC WATER TREATMENT APPARATUS

(75) Inventors: Gary L. Hatch, Sheboygan, WI (US);
Michael D. Steinhardt, Kiel, WI (US);
Michael J. Kurth, Howards Grove, WI (US); Marc A. Anderson, Madison, WI (US)

(73) Assignees: Pentair Filtration, Inc., Sheboygan, WI (US); Wisconsin Alumni Research Foundation, Madison, WI (US)

( * ) Notice: Subject to any disclaimer, the term of this patent is extended or adjusted under 35 U.S.C. 154(b) by 606 days.

(21) Appl. No.: 11/400,568

(22) Filed: Apr. 7, 2006

(65) Prior Publication Data
US 2006/0231470 A1      Oct. 19, 2006

Related U.S. Application Data

(60) Provisional application No. 60/671,017, filed on Apr. 13, 2005.

(51) Int. Cl.
*C02F 1/32* (2006.01)
(52) U.S. Cl. .............. 210/198.1; 210/748; 210/488; 138/42; 422/186.3; 250/437

(58) Field of Classification Search ............... None
See application file for complete search history.

(56) References Cited

U.S. PATENT DOCUMENTS

| | | | |
|---|---|---|---|
| 3,977,435 A * | 8/1976 | Bates ............... | 137/625.3 |
| 4,267,045 A * | 5/1981 | Hoof ............... | 210/322 |
| 5,006,248 A | 4/1991 | Anderson et al. | |
| 5,028,568 A | 7/1991 | Anderson et al. | |
| 5,035,784 A | 7/1991 | Anderson et al. | |
| 5,269,926 A | 12/1993 | Webster et al. | |
| 2005/0178704 A1 * | 8/2005 | Prochaska et al. ...... | 210/108 |

* cited by examiner

*Primary Examiner*—Duane Smith
*Assistant Examiner*—Douglas J Theisen
(74) *Attorney, Agent, or Firm*—Andrus, Sceales, Starke & Sawall, LLP

(57) ABSTRACT

A cartridge for a water treatment system, effective to assist in the removal of contaminants by photocatalytic oxidation and by adsorption, includes a plurality of stacked disks, preferably made of a UV light transmissive material, which disks define circuitous flow paths for water being treated. In a preferred embodiment, the disk surfaces contacted by the water are provided with a coating of a catalyst, such as $TiO_2$, activated by a UV light source positioned in the center of the cartridge.

23 Claims, 6 Drawing Sheets

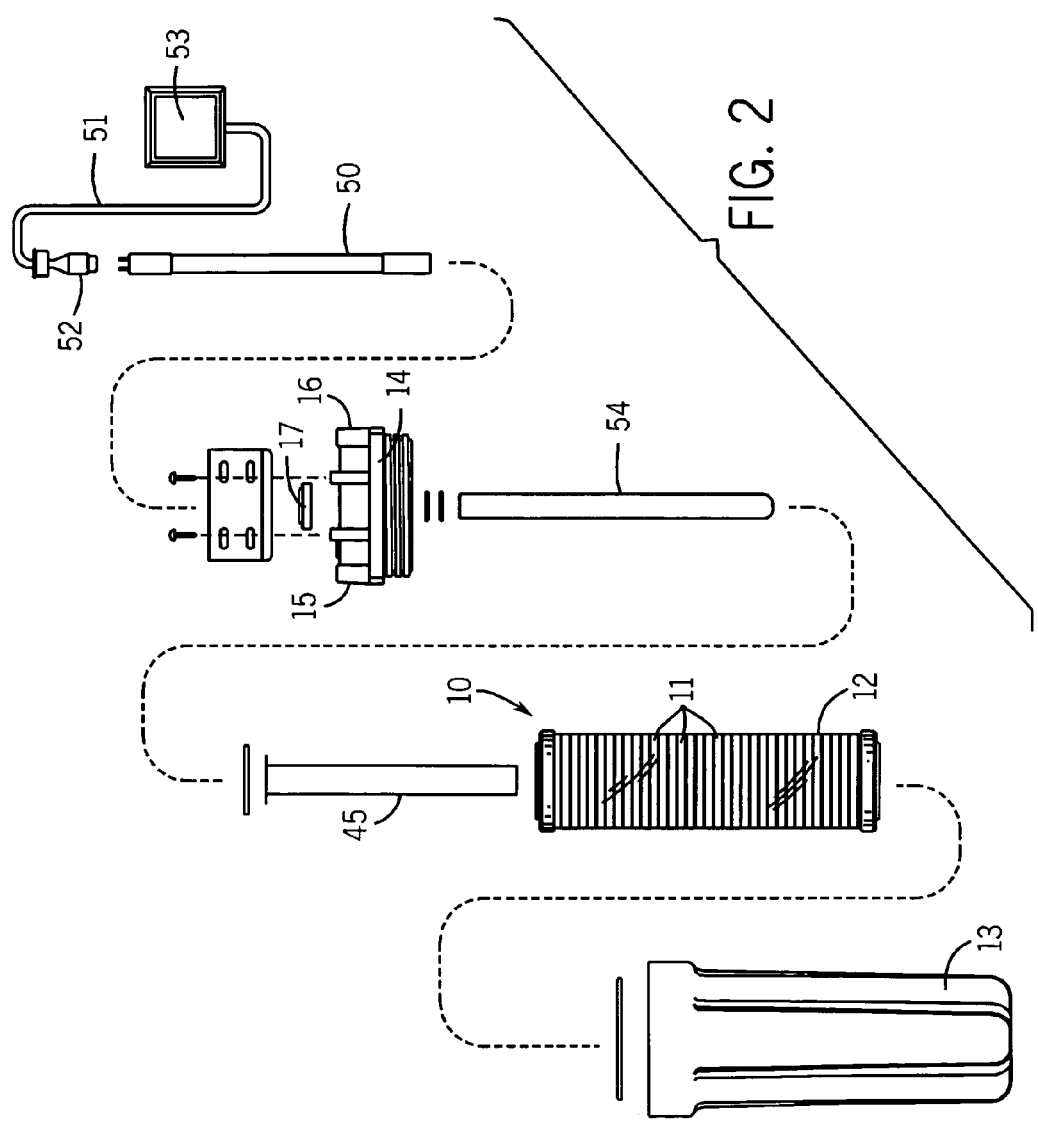

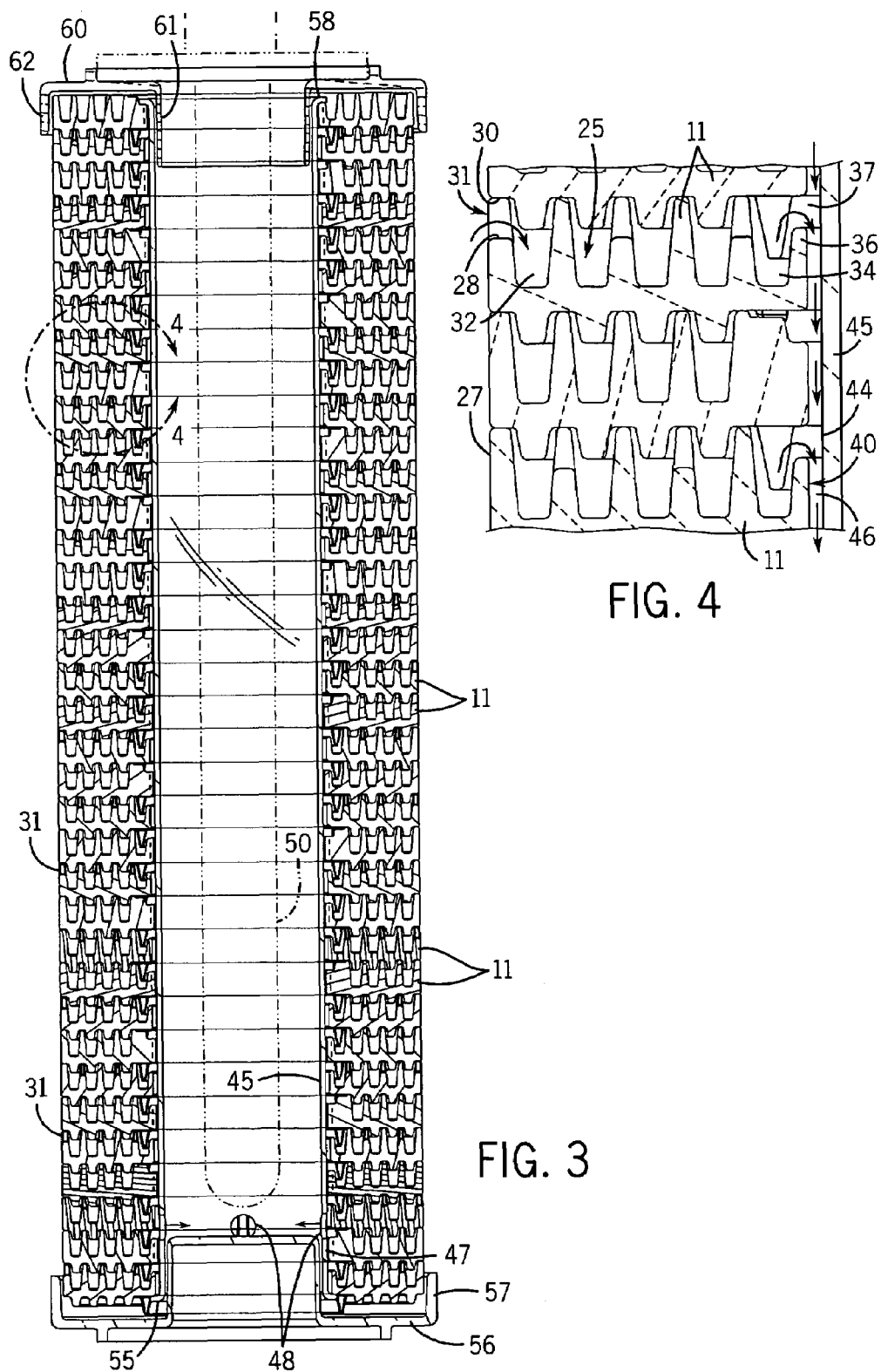

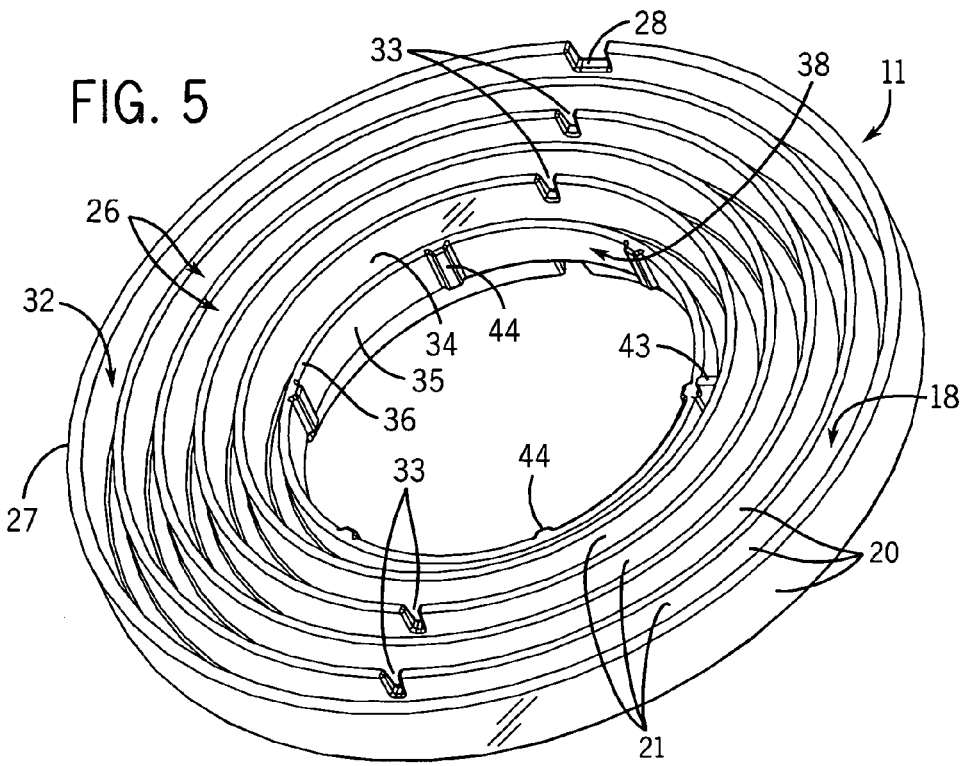
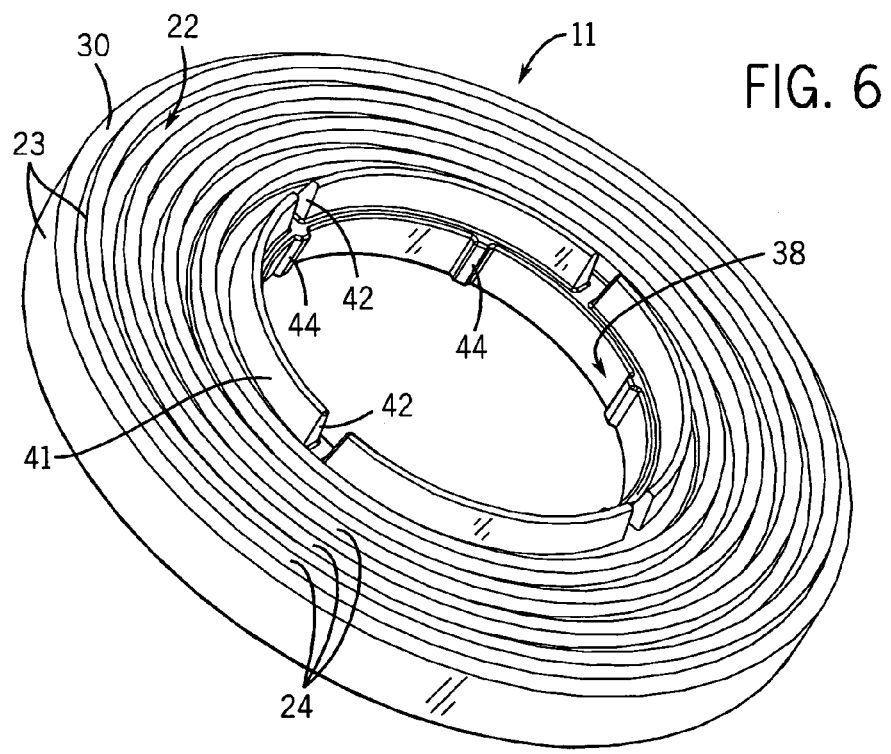

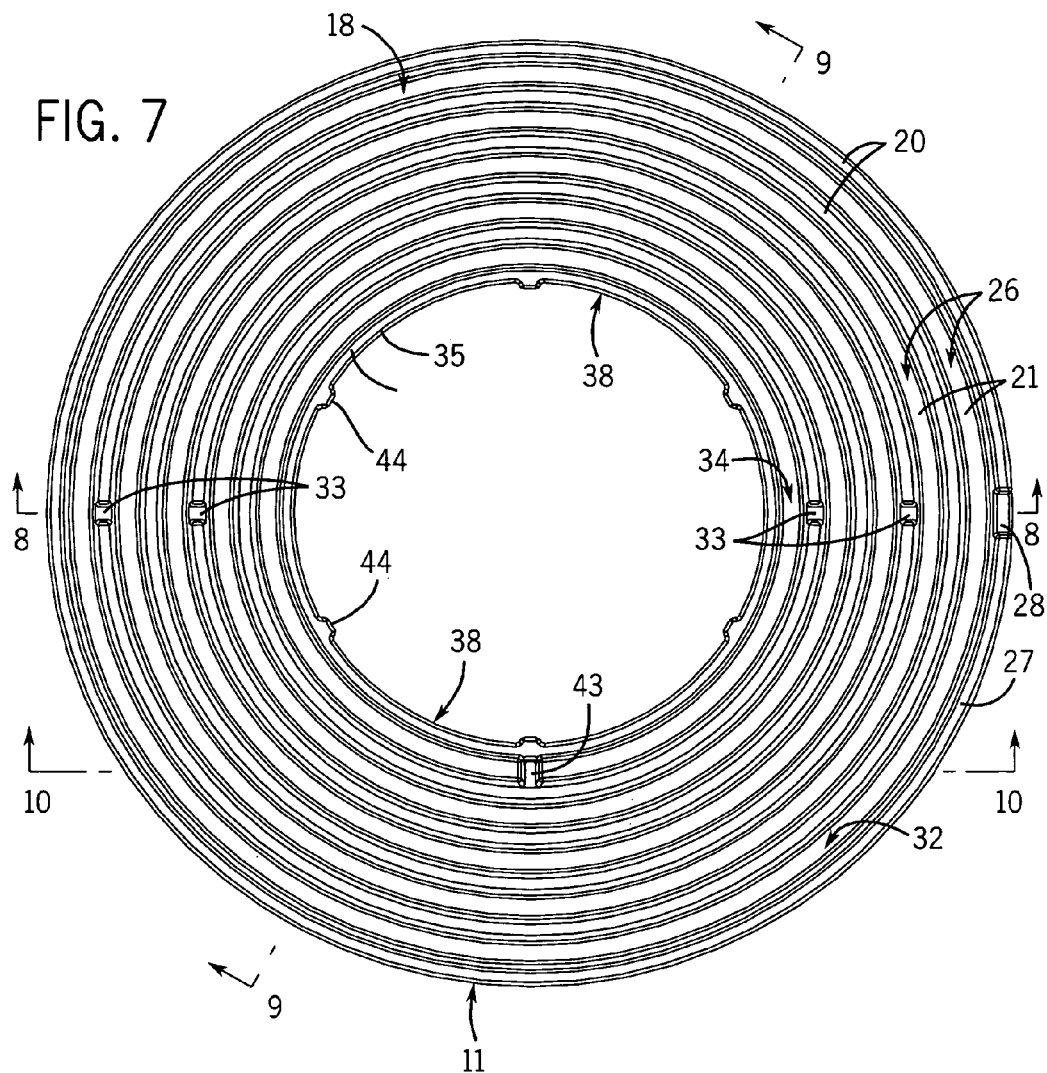

PHOTOCATALYTIC WATER TREATMENT APPARATUS

CROSS REFERENCE TO RELATED APPLICATION

The present application is based on and claims priority to U.S. Provisional Application Ser. No. 60/671,017, filed Apr. 13, 2005.

STATEMENT REGARDING FEDERALLY SPONSORED RESEARCH OR DEVELOPMENT

This invention was made with United States government support by the following agency: NAVY/ONR N00014-03-1-0647. The U.S. Government has certain rights in the invention.

BACKGROUND OF THE INVENTION

The present invention relates to the removal of contaminants from water by photocatalysis and by adsorption and, more particularly, to the use of ultraviolet-activated titania catalysts to remove both organic and inorganic contaminants from water.

It is known that photocatalytic oxidation using $TiO_2$ can effectively remove organic materials from water. This includes the removal of pathogenic microorganisms and complex organic molecules by oxidation in the presence of ultraviolet light. It is also known to oxidize inorganics, such as heavy metals, by UV-activated $TiO_2$ to change the valance state to enhance removal by other means. For example, arsenic (III) which is difficult to remove from water, can be oxidized to arsenic (V) which is easier to remove by a downstream process such as adsorption.

A method for utilizing photocatalysis with ultraviolet light using a titanium ceramic for the oxidation and destruction of complex organic compounds is described in U.S. Pat. No. 5,035,784 which is incorporated by reference herein. Metal oxide ceramics, including $TiO_2$, can also be formed as supported membranes for use in the photocatalytic oxidation of organics, as described in U.S. Pat. No. 5,269,926, also incorporated herein by reference.

In applying known technology to the practical treatment of drinking water, to remove both organic and inorganic contaminants, there are a number of considerations that must be addressed. The substrate on which the $TiO_2$ layer is deposited should act as a waveguide to distribute the ultraviolet light uniformly through the substrate to activate the $TiO_2$. The substrate material must not only be ultraviolet light transmissive, but should also not degrade in use. The substrate material should also be moldable so that the most efficient waveguide forms may be utilized. Also, the surface of the waveguide on which the $TiO_2$ layer is deposited should provide as large a surface area as practicable within the confines of the size limitations of the apparatus. Finally, the waveguide substrate should also be configured to maximize contact time with the contaminated water flowing thereover. And, of course, the apparatus must be configured to accommodate the ultraviolet light source, typically provided in a tubular construction.

SUMMARY OF THE INVENTION

In accordance with the present invention, a water treatment cartridge is particularly adaptable to provide oxidation of a wide variety of contaminants through the use of photocatalysis by ultraviolet radiation. Stacked disk waveguides made of a suitable transparent plastic define, between each disk pair, a tortuous flow path for the water to be treated that maximizes contact with the photocatalytic material, preferably titanium dioxide.

In accordance with one embodiment of the present invention, an apparatus for treating a flow of water to facilitate removal of contaminants therein comprises a pair of disks having complimentary interfitting structure on opposite disk faces, which structure is sized and positioned to define a flow chamber having a series of concentric channels; inlet means are provided for directing the flow of water to be treated into the outermost flow channel of the flow chamber; flow channel connecting means are provided to direct the flow serially from the outermost flow channel into the next adjacent flow channel in a manner that causes at least a portion of the flow to contact the flow channels along their full lengths; and, outlet means are provided in the disk pair to direct treated water from the innermost flow channel of the flow chamber toward an outlet from the apparatus. Preferably, the interfitting structure of the disk pair comprises patterns of alternating concentric ribs and grooves which patterns interengage when one disk is placed against another to define the concentric flow channels. The disks are preferably circular in shape and define open circular interiors. A plurality of pairs of stacked disks are utilized to form a cylindrical treatment cartridge with a cylindrical open interior, and means are provided for holding the assembly together. The outlet means for each disk pair communicates with the cylindrical open interior of the treatment cartridge.

In the preferred embodiment, a cylindrical center flow tube is inserted into and is contiguous with the open interior of the cartridge. The flow tube has an OD smaller than the ID of the cylindrical open interior to define therewith an annular flow path from the outlet means to one end of the flow tube. A flow passage is provided through one end of the flow tube to direct flow from the annular flow path to the interior of the flow tube, and a cartridge outlet is provided at the opposite end of the flow tube for the discharge of treated water from the apparatus.

In accordance with a preferred embodiment, a photocatalytic material is coated on the surfaces of the flow channels, and a light source, positioned in the cylindrical open interior, is operative to activate the photocatalytic material. One photocatalytic material that is particularly effective to oxidize a wide range of material in the water to be treated comprises titanium dioxide. The activating light source is ultraviolet light. The ultraviolet light source preferably comprises a tubular element that extends substantially the full length of the treatment cartridge.

One particularly preferred embodiment of the present invention comprises a plurality of circular disks, each of which disks has a pattern of alternating concentric ribs and grooves on one face and a complimentary pattern of alternating grooves and ribs on the opposite face. The patterns of ribs and grooves are sized to interengage when one disk is placed on another disk with one face of said one disk in contact with the opposite face of said other disk to define a flow chamber having a series of concentric flow channels. A flow inlet is provided in the radially outermost flow channel of each disk pair to direct water to be treated into the flow chamber. A flow passage connects each adjacent pair of concentric flow channels and each flow passage is located diametrically opposite the flow passage in the next adjacent flow channel such that the water to be treated follows a tortuous path and contacts the full the length of each flow channel. A flow outlet is provided from the radially innermost flow channel of each disk pair to direct treated water from the apparatus.

A coating of catalytic material is provided on the surfaces of the flow channels, the material preferably comprising UV activatable titanium dioxide. A UV light source is placed in operative association with the flow channels.

A plurality of pairs of disks are preferably stacked together to form a treatment cartridge. To facilitate the formation of a treatment cartridge, the disks are of a circular shape and having circular open interiors that define a cylindrical open interior in the treatment cartridge. A center flow tube is positioned in the cylindrical open interior of the cartridge and has axially opposite ends that are staked over the respective ends of the endmost disks in the stack to hold the assembly of stacked disk together. A closed end cap is provided to enclose one tube end and its associated disk, and an open end cap is provided to enclose the other tube end and its associated disk, the open end cap defining a cartridge outlet for treated water. The outside of the flow tube and the cylindrical open interior of the treatment cartridge define an annular flow path from the flow outlets of the disk pairs to the closed end of the flow tube. A flow passage is provided through the closed end of the flow tube to direct the flow of water from said annular flow path to the interior of the tube and to the cartridge outlet.

In the preferred embodiment, the disks are made from a transparent plastic material that is resistant to degradation from UV radiation. One particularly preferred plastic material comprises polymethylmethacrylate.

BRIEF DESCRIPTION OF THE DRAWINGS

FIG. 2 is an exploded view of the components of one embodiment of a system utilizing the water treatment cartridge of the present invention.

FIG. 3 is a vertical section through the filter cartridge of the present invention.

FIG. 4 is a sectional detail taken on line 4-4 of FIG. 3.

FIG. 5 is a perspective view of the upper face of a disk used in the assembly of a treatment cartridge of the present invention.

FIG. 6 is a perspective view of the bottom face of the disk shown in FIG. 5.

FIG. 7 is a top plan view of the disk.

DETAILED DESCRIPTION OF THE PREFERRED EMBODIMENTS

Figure 1:
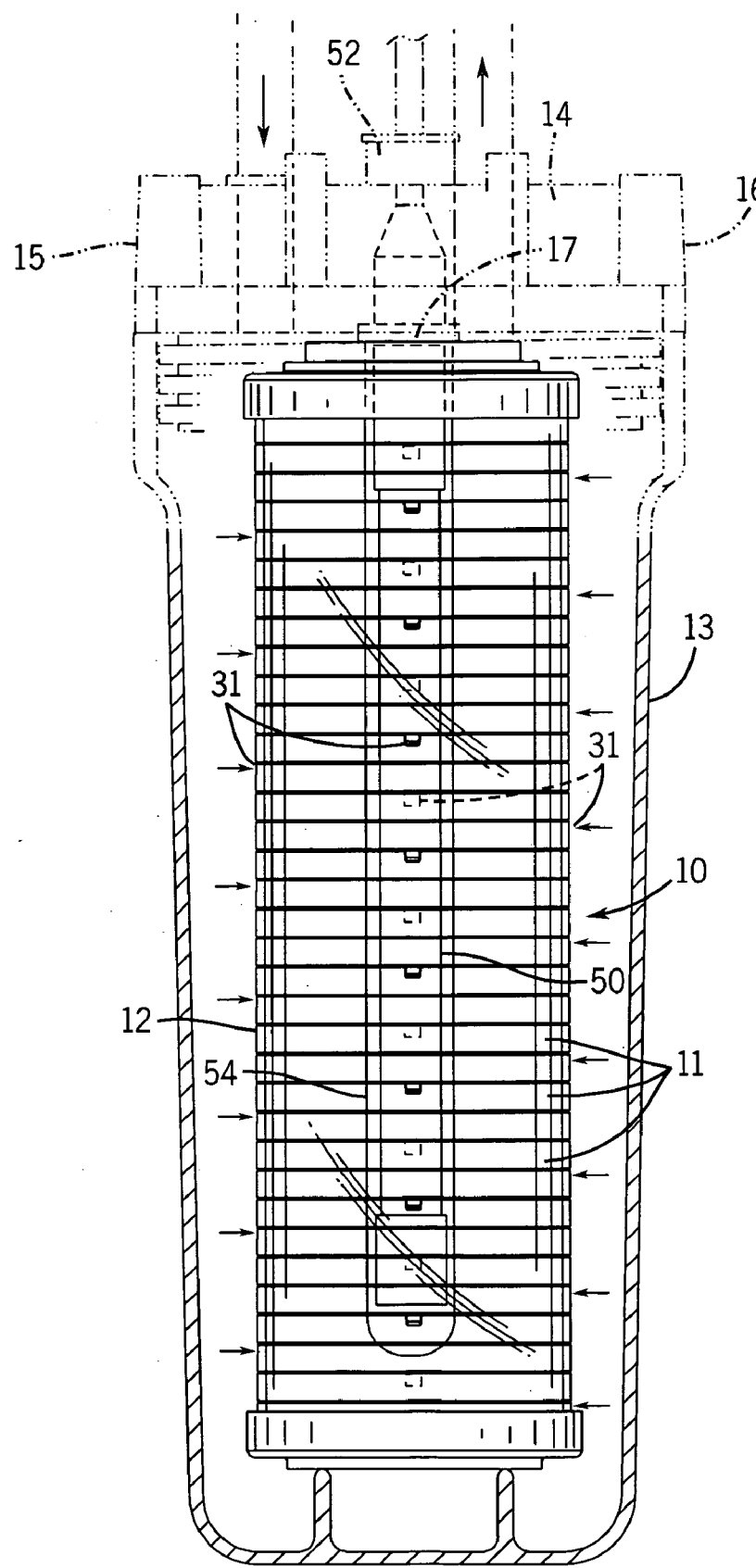
FIG. 1 is an elevation view of a water treatment cartridge of the present invention shown in its operative position enclosed in a housing.

A water treatment cartridge 10, as shown in FIGS. 1 and 2, is made by stacking a plurality of circular disks 11, as shown in FIGS. 5 and 6, to form an elongate cylindrical cartridge body 12. The cartridge body is adapted to be inserted into a sump or housing 13 and enclosed therein with a threaded header or end cap 14, all in a manner well known in the industry. The end cap 14 includes an inlet 15 for directing water to be treated into the housing 13 and an outlet 16 for the discharge of treated water. The end cap 14 may also include a connection 17 for providing electric current to a UV light source, as will be described in greater detail below.

Each of the disks 11 is identical and preferably is molded from a suitable plastic material which is both UV light transmissive and resistant to degradation in the presence of UV light. One particularly suitable material is polymethylmethacrylate (PMMA). Other suitable materials may also be used and, if the cartridge 10 is intended for use without photocatalytic treatment of water, light transmissive PMMA and similar materials would not be required.

Using the orientation of the disks 11 shown in FIGS. 5 and 6, each disk has an upper surface 18 which is provided with a pattern of alternating concentric upper ribs 20 and upper grooves 21. Similarly, the disk lower surface 22 is provided with a complimentary pattern of alternating lower ribs 23 and lower grooves 24. When one disk 11 is placed on another disk 11 such that the upper surface 18 of the lower disk is in contact with the lower surface 22 of the upper disk, the respective ribs 20 and 23 and grooves 21 and 24 interengage to form a flow chamber 25 comprising a series of concentric flow channels 26. The upper ribs 20 are substantially longer than the lower ribs 23 such that, when one disk is placed on another, the ends of the upper ribs 20 bottom in the lower grooves 24 of the adjacent disk to define the concentric flow channels 26. The shorter lower ribs 23 are, correspondingly, received in the upper grooves 21 of the adjacent disk but, because the lower ribs 23 do not bottom in the upper grooves 21, the open spaces define the flow channels 26.

The outermost 27 of the upper ribs 20 is provided with a notch 28. The peripheral outer edge of the lower surface 22 of the upper disk 11 is provided with a shoulder 30 which rests on the upper edge of the outermost rib 27 of the lower disk when placed thereon. The shoulder 30 and the notch 28 in the outermost upper rib 20 define a flow inlet 31 for admitting water into the outermost flow channel 32 of the flow chamber 25. Water entering the outermost flow channel 32 flows in both circumferential directions along the channel 180° where it passes through a flow passage 33 in the rib 20 defining a common wall between the outermost flow channel 32 and the next adjacent flow channel 26. Water flowing into the next adjacent flow channel flows in opposite circumferential directions along the channel until it reaches a flow passage 33 in the next adjacent rib 20. Thus, the flow passages 33 in adjacent ribs 20 are positioned 180° apart such that the water follows a tortuous path through the flow chamber 25 and contacts the walls defining full lengths of each flow channel 26. In the embodiment shown, there are five flow channels, but more or less could be provided as desired.

Figure 8:
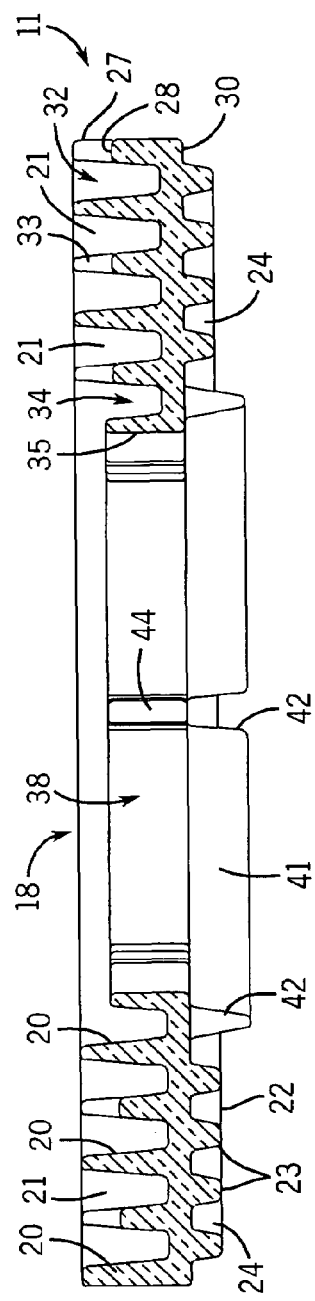
FIG. 8 is a sectional view taken on line 8-8 of FIG. 7.
Figure 9:
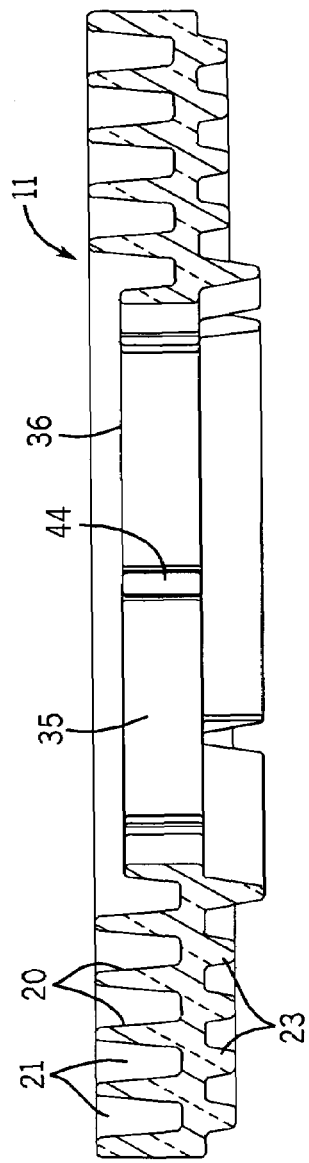
FIG. 9 is a sectional view taken on line 9-9 of FIG. 7.
Figure 10:
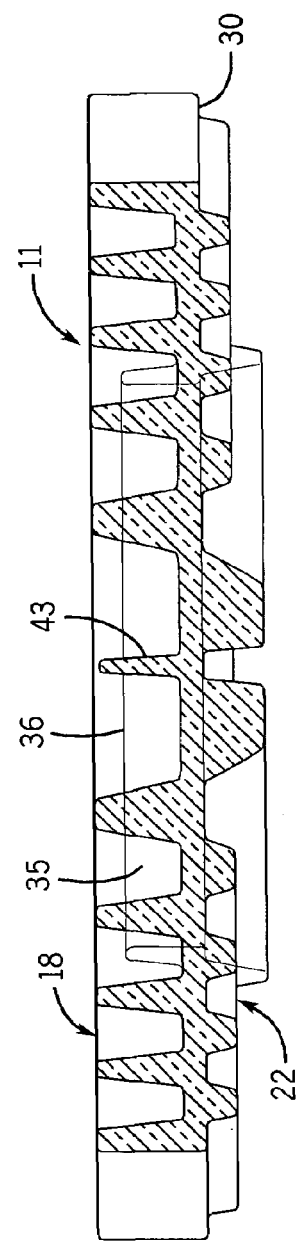
FIG. 10 is a sectional view taken on line 10-10 of FIG. 7.

As best seen in FIGS. 4 and 8, the innermost flow channel 34 has an inner wall 35 defined by a shortened upper rib 36 which does not bottom against the lower surface of the next adjacent disk. Rather, the shortened rib 36 which extends circumferentially around the entire disk defines an annular flow outlet 37 over which treated water flows as it exits the flow chamber 25 between each pair of disks 11.

The circular disks 11 have circular open interiors 38 which, when stacked to form a cartridge 10, define a cylindrical open interior 40 inside the cartridge. The cylindrical surface which defines the cylindrical open interior 40 is formed by the inside surfaces of the inner walls 35 of the disks, interrupted by the annular slot that comprises the flow outlet 37.

Referring to FIGS. 5-9, the innermost rib 41 of the lower ribs 23 is longer than the other lower ribs. Innermost rib 41 includes a series of indexing notches 42 formed 90° apart in the rib. When two disks 11 are placed face-to-face, the innermost rib 41 is received (but does not bottom) in the innermost flow channel 34. Innermost flow channel 34 is provided with an indexing lug 43 which, as two disks are brought together, will be engaged by the lower edge of the innermost lower rib 41. However, as one disk is rotated with respect to the other, an indexing notch 42 will eventually receive the indexing lug 43 and permit the two disks to interengage to form the flow channels as previously described. By utilizing four indexing notches 42, each disk may be rotated 90° with respect to the immediately adjacent disk, thereby permitting the flow inlet 31 to each disk pair to be indexed rotationally 90° from the flow inlet 31 of each adjacent disk pair in either axial direction. This permits a uniform distribution of inlet water flow into the cartridge, as is best shown in FIG. 1.

Referring again to FIGS. 5-9, the shortened rib 36 which comprises the innermost of the upper ribs 20 is provided with a plurality of circumferentially spaced standoffs 44. These standoffs 44 provide lateral support for a center flow tube which is positioned within and extends the full length of the cylindrical open interior 40 of the cartridge 10. Referring also to FIGS. 3 and 4, the standoffs 44 maintain the center flow tube 45 spaced from the cylindrical interior surface of the cartridge to define an annular flow path 46 from each of the flow outlets 37 to one end of the flow tube 45. Specifically, a closed lower end 47 of the flow tube 45 is provided with a number of flow passages 48 where water from the annular flow path 46 is permitted to flow into the interior of the flow tube 45 and then upwardly through an upper open end to the outlet 16 in the end cap 14.

In accordance with one embodiment of the present invention, the surfaces of the disks 11, particularly the surfaces of the ribs 20 and 23 and grooves 21 and 24 which define the flow chamber 25, are coated with a catalytic material that is effective in facilitating the removal of contaminants in the water flowing through the cartridge body 12. In a particularly preferred embodiment, a thin coating of photocatalytic titanium dioxide is applied to the disk surfaces. The coating may be applied by a vapor deposition process or any other suitable method to provide an extremely thin and transparent layer on the transparent plastic disks. The titanium dioxide coating is effective as both an adsorbent and UV-activated photocatalyst to assist in the removal of heavy metals, such as arsenic, the oxidation of complex organic compounds and the destruction of bacteria, viruses and protozoan cysts. Organic compounds and materials may be destroyed by photocatalytic oxidation and non-organics, such as arsenic, can be oxidized to different valence state where it is easier to remove downstream of the present invention. For example, arsenic III can be oxidized to arsenic V. Also, some metals can be removed by chemical reduction and filtering out or plating out. It is also believed that the titanium dioxide catalyst has inherent adsorption capability to effect the direct removal of heavy metals such as lead and arsenic.

The transparent disks made of UV transmitting materials, such as PMMA, allow the transmission of ultraviolet light from a source, placed inside the cylindrical open interior 40 of the cartridge, to reach all surfaces coated with titanium dioxide or other suitable catalyst/adsorbent. Referring to FIGS. 1 and 2, a long tubular UV lamp 50 is connected at an upper end to the end cap 14 and extends into the open interior of the cartridge 10 for substantially the full length thereof. Leads 51 for electric current extend from a lamp connector 52 to a suitable power source 53. The UV lamp 50 is protected by an outer transparent tubular sleeve 54. With the arrangement of the present invention, the photocatalyst (e.g. Ti O$_2$) can be activated by transmitting the UV light through the transparent plastic disks and, in addition, the photocatalyst can be activated by direct transmission of UV where the coated surfaces of the disks are in the direct path of the UV light. The transparent disks 11 of the construction described herein have been found to be particularly effective as waveguides for the transmission of UV light through the material.

Referring again to FIG. 3, the center flow tube 45 is also used to assemble the stack of disks 11 and to hold the same in place after assembly. The lower end of the flow tube 45 is staked or flared to provide a lower annular lip 55. The tube 45 is supported on a raised circular center portion of a closed end cap 56. A plurality of disks, suitably indexed at 90° with respect to one another, are placed along the tube 45, the lowermost disk 11 being received in a flanged recess 57 in the end cap with a suitable sealant sealing the interface. When the stack of disks has been completed, the upper end of the flow tube 45 is staked over the uppermost disk to form an upper lip 58 that holds the stack together. An upper open end cap 60 is placed over the assembly with an open center sleeve 61 inserted into the upper end of the tube and a flanged recess 62 enclosing the upper disk, again with a suitable sealant placed in the interface.

What is claimed is:

1. An apparatus for treating a flow of water to facilitate the removal of contaminants therein, comprising:
   a pair of disks having complementary interfitting structure on opposite disk faces sized and positioned to define a flow chamber having a series of concentric flow channels;
   inlet means for directing the flow of water to be treated into the outermost flow channel of the flow chamber;
   flow channel connecting means for directing the flow serially from the outermost flow channel into the next adjacent flow channel in a manner causing at least a portion of the flow of water to contact the flow channels along their full lengths; and,
   outlet means for directing treated water from the innermost flow channel of the flow chamber toward an outlet from the apparatus.

2. The apparatus as set forth in claim 1 wherein said interfitting structure comprises patterns of alternating concentric ribs and grooves on opposite disk faces, which patterns of ribs and grooves interengage when one disk is placed against another disk to define said concentric flow channels.

3. The apparatus as set forth in claim 2 wherein said disks are circular in shape and define open circular interiors.

4. The apparatus as set forth in claim 3 comprising an assembly of a plurality of pairs of stacked disks and means for holding said assembly to form a cylindrical treatment cartridge with a cylindrical open interior.

5. The apparatus as set forth in claim 4 wherein the outlet means for each disk pair communicates with the cylindrical open interior.

6. The apparatus as set forth in claim 5 comprising:
   a cylindrical center flow tube continuous with the open interior of the cartridge, said flow tube having an OD smaller than the ID of said cylindrical open interior to define therewith an annular flow path from the outlet means to one end of the flow tube;
   a flow passage through said one end of the flow tube to direct flow from said annular flow path to the interior of said flow tube; and,
   a cartridge outlet at the opposite end of the flow tube for discharging the treated water from the apparatus.

7. The apparatus as set forth in claim 4 including a photocatalytic material coated on the surfaces of the flow channels, and a light source operatively positioned in the cylindrical open interior to activate the photocatalytic material.

8. The apparatus as set forth in claim 7 wherein the photocatalytic material is effective to oxidize material in the water to be treated.

9. The apparatus as set forth in claim 8 wherein the photocatalytic material is titanium dioxide and the light source is ultraviolet light.

10. The apparatus as set forth in claim 9 wherein said ultraviolet light source comprises a tubular element extending substantially the full length of the treatment cartridge.

11. An apparatus for treating water to facilitate the removal of contaminants therein comprising:
- a plurality of circular disks, each disk having a pattern of alternating concentric ribs and grooves on one face and a complementary pattern of alternating grooves and ribs on the opposite face;
- said patterns of ribs and grooves sized to interengage when one disk is placed on another disk with the one face of one disk in contact with the opposite face of the other disk to define a flow chamber having a series of concentric flow channels;
- a flow inlet in the radially outermost flow channel of each disk pair to direct water to be treated into the flow chamber;
- a flow passage connecting each adjacent pair of concentric flow channels, each flow passage being located diametrically opposite the flow passage in the next adjacent flow channel, such that the water to be treated follows a tortuous path and contacts the full length of each flow channel; and,
- a flow outlet from the radially innermost flow channel to direct treated water from the apparatus.

12. The apparatus as set forth in claim 11 including a coating of a catalytic material on the surfaces of the flow channels.

13. The apparatus as set forth in claim 12 wherein the catalytic material comprises UV activatable titanium dioxide.

14. The apparatus as set forth in claim 13 including a UV light source operatively associated with the flow channels.

15. The apparatus as set forth in claim 11 comprising an assembly of a plurality of pairs of disks stacked together to form a treatment cartridge.

16. The apparatus as set forth in claim 15 wherein said disks are circular and have circular open interiors defining a cylindrical open interior in the treatment cartridge.

17. The apparatus as set forth in claim 16 comprising:
- a center flow tube positioned in the cylindrical open interior of the cartridge, said flow tube having axially opposite ends flared over the respective ends of the endmost disks to hold the assembly of stacked disks together;
- a closed end cap enclosing one tube end and its associated disk; and,
- an open end cap enclosing the other tube end and its associated disk and defining a cartridge outlet for treated water.

18. The apparatus as set forth in claim 17 wherein the outside of the flow tube and the cylindrical open interior of the treatment cartridge define an annular flow path from the flow outlets to the closed end of the flow tube;
- a flow passage through the closed end to direct the flow of water from said annular flow path to the interior of the tube and to the cartridge outlet.

19. The apparatus as set forth in claim 11 wherein the disks are made from a transparent plastic material resistant to degradation from UV radiation.

20. The apparatus as set forth in claim 19 wherein the plastic material comprises polymethylmethacralate.

21. The apparatus as set forth m claim 7 wherein the disks are made of a UV transmissive material, whereby the photocatalytic material coated on the disks can be activated by the transmission of UV light through the transmissive material to all the coated surfaces.

22. The apparatus as set forth in claim 7 wherein the photocatalytic material is effective to provide chemical reduction of material in the water to be treated.

23. The apparatus as set forth in claim 7 wherein the photocatalytic material on disk surfaces exposed directly to the light from the source is activated by direct transmission.

\* \* \* \* \*